3 Sheets—Sheet 1.

P. PEARTREE.
Device for Converting Vibrating into Rotary Motion.

No. 240,536.  Patented April 26, 1881.

WITNESSES:
James H. Slade
James T. Goodfellow

INVENTOR:
Peter Peartree,
by Austin F. Park.
Attorney.

N. PETERS, PHOTO-LITHOGRAPHER, WASHINGTON, D.C.

3 Sheets—Sheet 2.

P. PEARTREE.
Device for Converting Vibrating into Rotary Motion.

No. 240,536. Patented April 26, 1881.

WITNESSES:
James N. Slade.
James T. Goodfellow

INVENTOR:
Peter Peartree,
by Austin F. Park
attorney.

3 Sheets—Sheet 3.

P. PEARTREE.
Device for Converting Vibrating into Rotary Motion.

No. 240,536.　　　　　　　Patented April 26, 1881.

WITNESSES:　　　　　　INVENTOR:
James H. Slade　　　　　Peter Peartree
James T. Goodfellow　　　by Austin F. Park
　　　　　　　　　　　　　　　attorney

UNITED STATES PATENT OFFICE.

PETER PEARTREE, OF COHOES, ASSIGNOR TO WARREN T. KELLOGG, OF LANSINGBURG, NEW YORK.

DEVICE FOR CONVERTING VIBRATING INTO ROTARY MOTION.

SPECIFICATION forming part of Letters Patent No. 240,536, dated April 26, 1881.

Application filed July 29, 1879.

*To all whom it may concern:*

Be it known that I, PETER PEARTREE, of the city of Cohoes, in the county of Albany and State of New York, have invented certain Improvements in Devices for Converting Vibrating into Rotary Motion, of which the following is a specification, reference being had to the accompanying drawings, in which—

Figure 1:
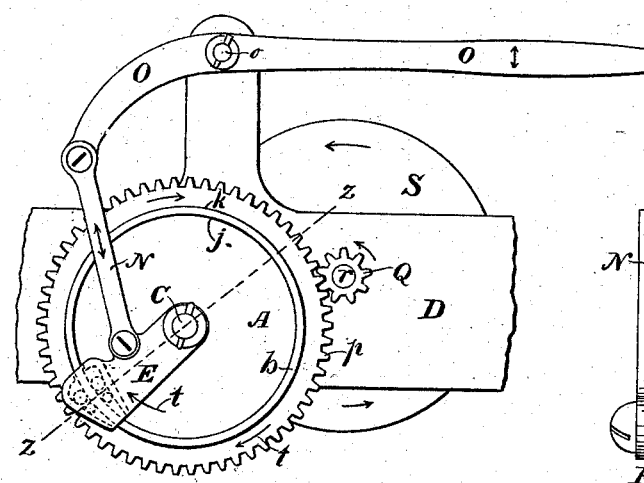
Figure 3:
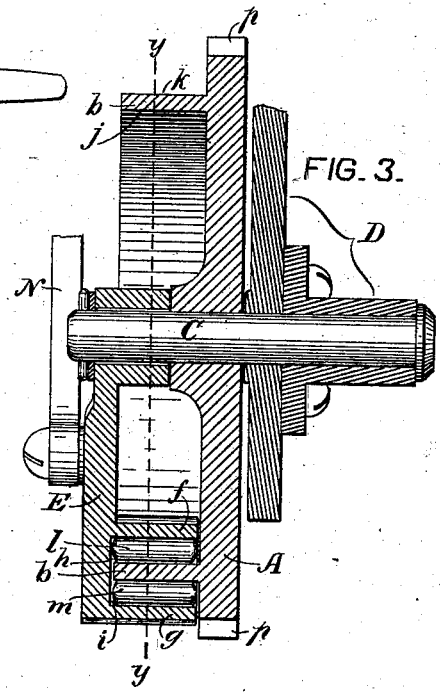
Figure 2:
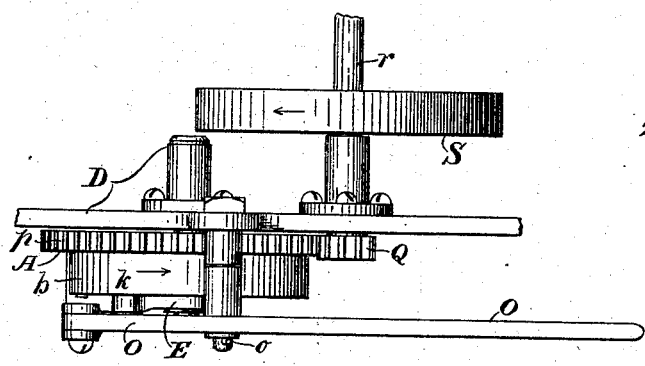
Figure 4:
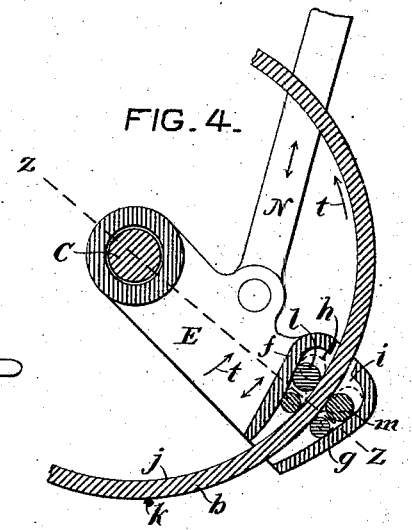
Figure 5:
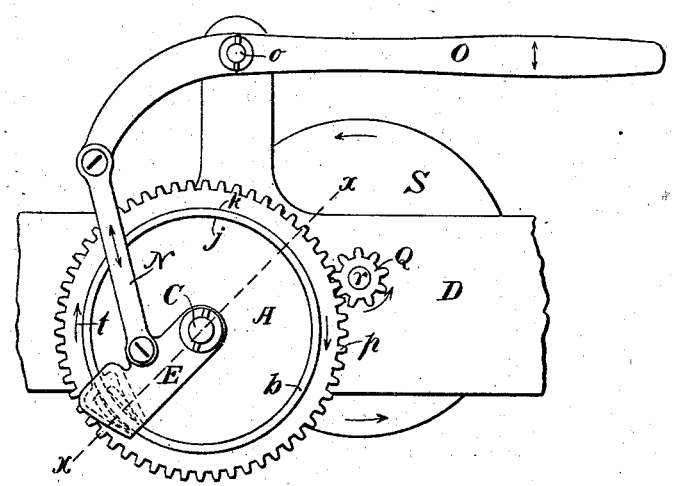
Figure 6:
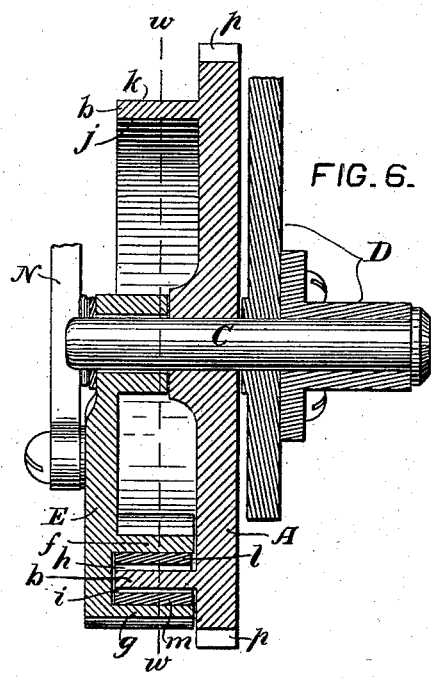
Figure 8:
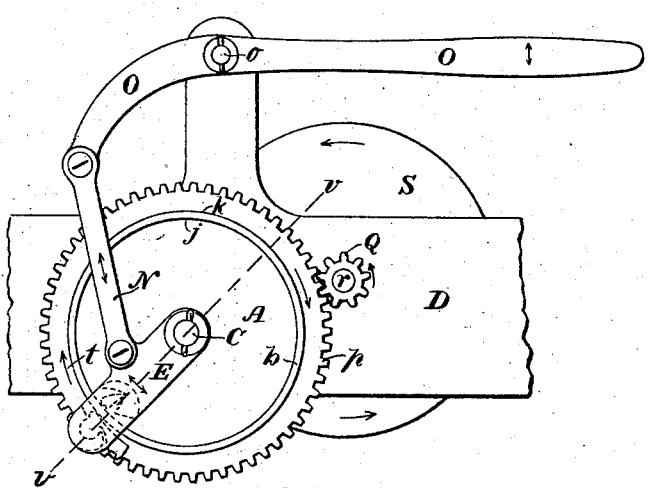
Figure 9:
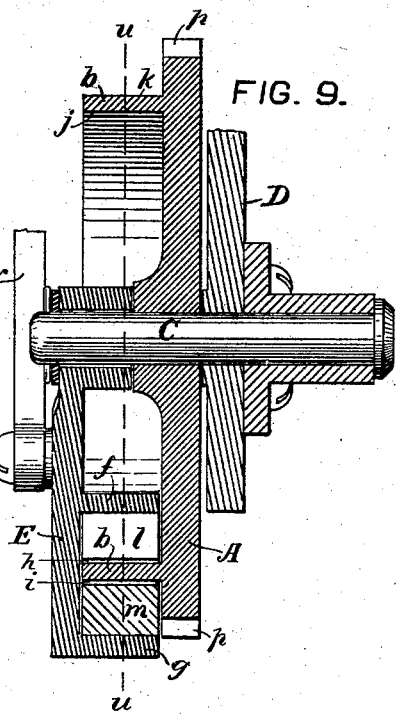

Figure 1 is a side elevation, Fig. 2 a plan, Fig. 3 a section at the line $z\,z$ in Figs. 1 and 4, and Fig. 4 a partial section at the line $y\,y$ in Fig. 3, all of a device embodying one form of this invention. Fig. 5 is a side elevation, Fig. 6 a section at the line $x\,x$ in Figs. 5 and 7, and Fig. 7 a section at the line $w\,w$ in Fig. 6, of a device which embodies a modification of the same invention. Fig. 8 is a side elevation, Fig. 9 a section at the line $v\,v$ in Figs. 8 and 10, and Fig. 10 a section at the line $u\,u$ in Fig. 9, all of a device that embodies another modification of my said invention.

Similar parts are marked by like letters in the different figures.

This invention consists of certain improved devices, hereinafter described and claimed, for communicating rotary motion to a wheel from a vibrating arm or lever, and is especially suitable for turning a windlass, rotary pump, fly-wheel gearing of light machinery, or a rotary fan or blower, by hand or foot power applied intermittingly to a lever or treadle.

Rotary motion has been heretofore communicated to a wheel having a lateral annular concentric flange from a vibrating arm or lever pivoted concentrically with that flange, and having in its outer end part a recess with a loose griping-piece, roller, or rollers therein, and contiguous to the inner concave surface of the annular flange, so that while the said arm or lever was being moved in one direction the said griping-piece, roller, or rollers would wedge or bind between and against the outer-end surface of the arm or lever and the inner surface of the annular flange, and thereby turn the wheel, and so that while the arm or lever was being stopped and turned in the opposite direction the same griping-piece, roller, or rollers would then be released, so as to permit the wheel to continue to revolve or not turn the wheel backward. In such cases the wedging or binding of the griping-piece, roller, or rollers between the outer-end surface of the arm or lever and the inner surface of the wheel-flange, in turning forward the wheel, exerted an immense outward pressure against the inner surface only of the wheel-flange, tending to burst out the latter, and a like inward pressure against the arm or lever, causing great pressure and friction on its pivot, tending to break off the latter and to retard the forward turning of the wheel. Also, prior to my invention, rotary motion had been imparted to a wheel having a lateral concentric annular flange from a driving-lever pivoted at or in line with the axis of the wheel, and extended radially far outside of the circle of the annular flange by means of a griping-lever loosely pivoted to the driving-lever at a point far outside of the circle of the wheel-flange, and extended inward to and past the latter, and movable to and fro in an arc, and endwise on and about its pivot in a plane parallel to the plane of the wheel, and having opposite to the inner and outer surfaces of a short section of the flange two pins or griping-lugs secured to the griping-lever, either rigidly or so as to be somewhat movable therein in directions transverse to, but not in the circumferential direction of, the wheel-flange, as set forth in United States Patents Nos. 86,833 and 99,761, so that such device could gripe and release opposite surfaces of the flange only by reason of the vibrating and endwise movements of the whole griping-lever about its pivot on the driving-lever far outside of the circle of the flange, and such outward extensions of the driving and griping levers were, in operation, liable to strike against outside objects, and to materially interfere with the convenient application and use of the device on wheels closely surrounded by machinery or stationary casings.

To cheaply and effectually overcome the aforesaid defects is the primary object of this invention.

Figure 7:
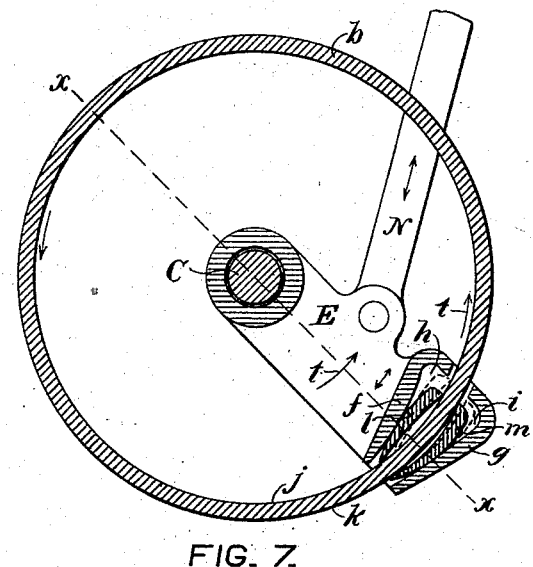
Figure 10:
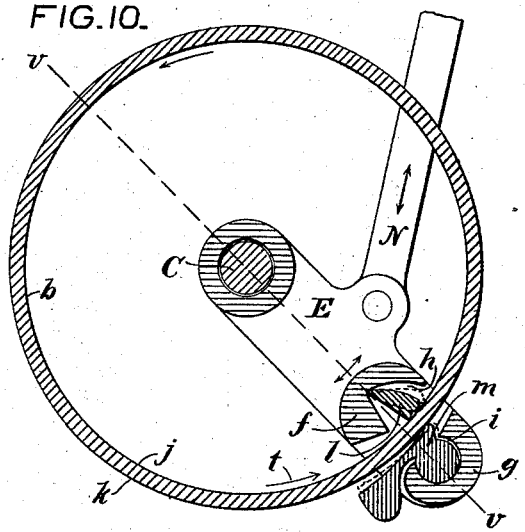

To that end I provide a wheel, A, having a lateral annular flange, $b$, and mounted to turn on or with a stud or shaft, C, concentric with said flange, and held by any suitable support, D, and I combine therewith an arm or lever, E, pivoted upon the stud or shaft C, or otherwise concentrically with the wheel-flange b, all in the usual manner; and, in addition, I construct the outer portion of the arm or lever E with two lateral lugs, f and g, rigidly fast on that arm or lever, and having therein recesses h and i opposite to each other and to the inner concave surface, j, and outer convex surface, k, of the flange b, and I arrange opposite to each other in the recesses h and i two loose separate griping-pieces, l and m, which are either in the form of rollers, as in Fig. 4, or of wedges, as in Fig. 7, or of braces or toggles, as in Fig. 10, and which are somewhat movable to and fro in the recesses in the direction of the circumference of the flange of the wheel, so that in turning the arm E in one direction (indicated by the arrow t) the two separate and opposite griping-pieces, l and m, in the recesses h and i in the lugs f and g shall then bind between and against those two lugs and the opposite parts of the inner and outer surfaces of the flange b, substantially as represented in full lines in Figs. 4, 7, and 10, and shall thereby turn the wheel A in the direction pointed by the arrow t, and so that in turning the arm E in the opposite direction the two griping-pieces l and m will then be released in the recesses h and i, as indicated by dotted lines, so as to let the flange b turn freely between them in the direction of the arrow t, and not materially tend to turn the wheel in the opposite direction.

In this improved device the outward pressure against the inner surface of the flange b by the binding of the griping-piece l between that flange and the inner lug, f, on the arm E is counteracted by the simultaneous inward pressure against the outer surface of the same part of the flange by the binding of the griping-piece m between that flange and the outer lug, g, on the same arm, and consequently all injurious endwise inward pressure by the arm E against its pivot-support C, and all material excess of outward or inward pressure against the flange b by the piece l or m, is prevented.

To render this device suitable for very convenient use in operating a rotary fan or blower by power applied intermittingly by hand I combine with the arm E a connecting-rod, N, and a hand-lever, O, pivoted at o to the support D, and I often prefer to construct the wheel A with a toothed rim, p, and combine therewith a pinion, Q, fast on a shaft, r, having a fly-wheel, S, fast thereon, and mounted in the stock D, substantially as shown in the drawings.

What I claim as my invention is—

1. The combination, with the wheel having the concentric flange b and the arm E, pivoted at the axis of the wheel, of two opposite lugs, f and g, fast on said arm, and having recesses h and i, and griping-pieces l and m in the recesses, and somewhat movable therein in the direction of the circumference of the flange of the wheel, and arranged to gripe opposite surfaces of the same part of the flange, substantially as described.

2. The combination, with the wheel having the concentric annular flange b and the arm E, pivoted at the axis of the wheel, of two opposite lugs, f and g, fast on said arm, and having recesses h and i, griping-pieces l and m in the recesses, and somewhat movable therein in the circumferential direction of the flange of the wheel, and arranged to gripe opposite surfaces of the same portion of the flange, the driving-lever O, and rod N, connecting said arm and lever, all substantially as described.

In testimony whereof I hereunto set my hand, in the presence of two subscribing witnesses, this 22d day of February, 1879.

PETER PEARTREE.

Witnesses:
ROBERT JOHNSTON, 2d,
WILLIAM A. WELLS.